No. 713,292. Patented Nov. 11, 1902.
J. D. EDWARDS.
OIL FILTER.
(Application filed June 14, 1901.)
(No Model.)
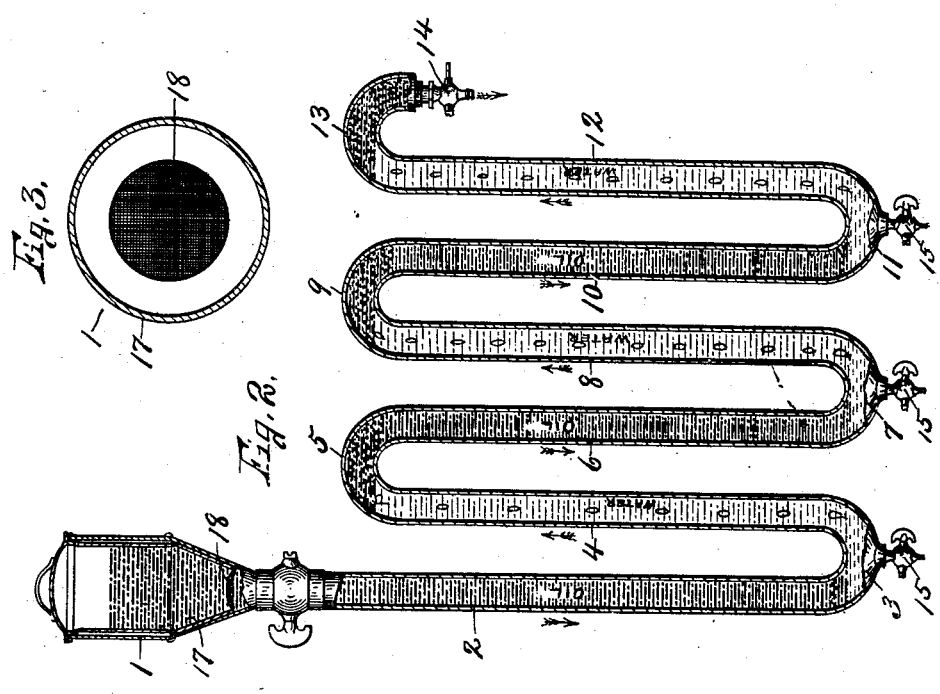
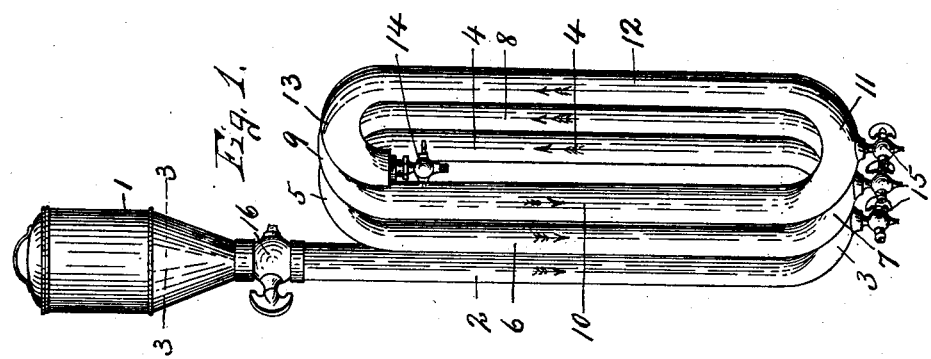
WITNESSES:
E. H. Benson
J. E. Arthur
INVENTOR
John D. Edwards.
BY
Smith & Davidson
ATTORNEYS.

UNITED STATES PATENT OFFICE.

JOHN D. EDWARDS, OF WEEDSPORT, NEW YORK.

OIL-FILTER.

SPECIFICATION forming part of Letters Patent No. 713,292, dated November 11, 1902.

Application filed June 14, 1901. Serial No. 64,566. (No model.)

*To all whom it may concern:*

Be it known that I, JOHN D. EDWARDS, of Weedsport, in the county of Cayuga, in the State of New York, have invented new and useful Improvements in Oil-Filters, of which the following, taken in connection with the accompanying drawings, is a full, clear, and exact description.

My invention relates to improvements in apparatus for filtering oil in which a liquid, as water, is the filtering medium.

The object of this invention is to produce a simple, compact, and efficient device whereby the oil is successively fed from a suitable reservoir through a series of upright legs or conduits containing a filtering fluid of greater specific gravity than the oil, the oil being collected at the top of each filter-leg by upward displacement.

A further object is to provide means whereby the oil may be fed in any desired quantity through the filtering-legs.

A still further object is to provide the filtering device with a series of valves, whereby the oil or filtering fluid may be drawn off at any time for the purpose of removing the sediment from the bases of the loops which form the oil and filtering legs.

To this end the invention consists in the combination, construction, and arrangement of the component parts of a filter device, as hereinafter described, and pointed out in the claims.

Referring to the drawings, Figure 1 is a perspective view of my improved filtering apparatus. Fig. 2 is a transverse vertical section through the oil and filtering legs, the loops of the filtering device being shown as extended laterally in substantially the same plane; and Fig. 3 is an enlarged section on line 3 3, Fig. 1.

Similar reference characters indicate corresponding parts in all the views.

As seen in the drawings, this invention consists of an oil-reservoir 1, having a depending leg or conduit 2, the lower end of which is provided with a return-bend 3, to which is connected an upright conduit or leg 4. The upper end of the leg or conduit 4 is also provided with a return-bend 5, having a downwardly-extending leg 6, the lower end of which is also provided with a return-bend 7 and an upwardly-extending leg 8. In like manner the upright leg or conduit 8 is provided with a return-bend 9, having a downwardly-extending conduit 10, the lower end of which is provided with a return-bend 11 and an upwardly-extending conduit 12. These several conduits 2, 4, 6, 8, 10, and 12, together with the return-bends 3, 5, 7, 9, and 11, form a series of loops and may be extended indefinitely, the last leg, as 12, having its upper end provided with a return-bend 13 and a discharge-valve 14. The several loops or legs are previously filled with water or other filtering fluid of greater specific gravity than the oil until said filtering fluid flows out of the valve 14, which indicates that the several loops are filled with the filtering fluid.

The leg 2 extends above the level of the upper ends of the return-bends 5, 9, and 13, and the filtering fluid is supplied to the several loops through the reservoir 1 and leg 2 and is permitted to discharge through the valve 14 until the water is lowered in the leg 2 to substantially the same level as in the remaining loops.

The reservoir 1 is mounted upon the upper end of the leg 2 a sufficient distance to contain a column of oil having sufficient weight to displace the water from the leg 2. The reservoir is then filled with the oil to be filtered, and it is apparent that as the water is displaced from the conduit 2 it is forced upwardly into the conduit 4, thereby filling the leg or conduit 4 from a level substantially coincident with the upper wall of the return-bend 3 to the level of the lower wall of the return-bend 5, and owing to the fact that the oil is of less specific gravity than the filtering fluid said oil rises through the filtering fluid in the leg 4 and is collected at the top of the filtering fluid in the leg 4, and as the oil continues to collect at the top of the filtering fluid in the leg 4 the water or other filtering fluid in the leg 6 is forced downwardly until the filtering fluid is entirely displaced from the water-leg 6. In the same manner the oil rises through the filtering fluid in the next adjacent leg 8, being collected at its upper end and displacing the water from the next leg 10, and so on through the leg 12 until the oil is collected at the upper end of said leg 12 and discharges in a thoroughly-filtered condition through the outlet-valve 14.

The principle of my invention is well illustrated by the first step—that is, by the displacing of the water from the leg 2 into the leg 4 by means of a superior weight of oil in the reservoir and upwardly-extending portion of the leg 2, and, if desired, the valve 14 may be connected directly to the downturned end of the return-bend 5, in which case the oil would be filtered through only one column of water, the remaining columns of water being only for the purpose of further filtering the oil, and the loops may be extended indefinitely, it being apparent that the greater number of loops there are the better will be the filtration of the oil.

The lower walls of the several return-bends 3, 7, and 11 are each provided with a discharge-opening and a valve, as 15, whereby the sediment which may accumulate in these return-bends may be readily drawn off when desired. I also provide the upright leg or column 2 with a valve 16, which is usually arranged at the base of the reservoir for controlling the flow of oil from said reservoir. In order to further provide for the filtration of the oil, I preferably arrange within the reservoir 1 a suitable hopper 17, which is provided at its base with a screen 18, through which the oil must pass before passing to the upright leg 2. This hopper is preferably removable, the upper end of the reservoir 1 being open and provided with a removable cap for permitting this removal of the hopper and enabling the attendant to clean the screen whenever it may become necessary.

It will be apparent from the foregoing description and the accompanying drawings that when the valve 16 in the leg 2 is opened the speed of the flow of oil through the several filtering-columns may be regulated by the valve 14, or it may be controlled by the valve 16 in the upper end of the leg 2, if desired, for producing either a slow or rapid filtration.

The operation of my invention will now be readily understood upon reference to the foregoing description and the accompanying drawings, and it will be noted that the essential feature of this invention is to provide two upright legs or conduits connected at their bases, the upper end of one being connected to an oil-reservoir and the other containing a filtering fluid, whereby the oil from the reservoir passes downwardly and upwardly through the filtering fluid and is collected at the top of the filtering-column, and that the several loops may be arranged in any desired manner, either as seen in Fig. 1 or as shown in Fig. 2.

Having thus fully described my invention, what I claim, and desire to secure by Letters Patent, is—

1. An oil-filter consisting of an upright water-leg having its upper and lower ends provided with return-bends, an oil-leg extending upwardly from the lower return-bend and above the upper bend, and a reservoir discharging into the upper end of the oil-leg.

2. An oil-filter consisting of a substantially U-shaped conduit adapted to be first filled with a filtering liquid as water, one of the arms being longer than the other and arranged to receive a column of oil of sufficient gravity to displace the water therefrom into the shorter arm.

3. An oil-filter consisting of a U-shaped conduit having one arm longer than the other for the purpose described, the shorter arm having its upper end provided with a return-bend, and a second U-shaped conduit having one arm connected to the upper return-bend of the former U-shaped conduit.

4. An oil-filter consisting of a U-shaped conduit having one arm longer than the other for the purpose described, the shorter arm having its upper end provided with a return-bend, and a second U-shaped conduit having its arms of substantially the same length as the shorter arm of the other conduit, one of the arms of the latter conduit being connected to the upper return-bend of the former conduit and its other arm terminating in a return-bend.

5. An oil-filter consisting of upright legs united at their lower ends and provided with a clean-out opening at their junction, one of the legs being extended upwardly and above the other as and for the purpose described and provided with a valve and an oil-reservoir, and the other leg having a return-bend at its upper end for the purpose set forth.

In witness whereof I have hereunto set my hand this 12th day of June, 1901.

JOHN D. EDWARDS.

Witnesses:
  JNO. F. KINGSTON,
  ISAAC CHADDERDON.